(12) United States Patent
Smith et al.

(10) Patent No.: US 6,574,487 B1
(45) Date of Patent: Jun. 3, 2003

(54) COMMUNICATION DEVICE WITH A DUAL-SIDED LIQUID CRYSTAL DISPLAY

(75) Inventors: Steven W. Smith, Evanston, IL (US); Michael J. Sawadski, Calumet City, IL (US); Steven C. Emmert, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/510,795

(22) Filed: Feb. 23, 2000

(51) Int. Cl.⁷ .................................................. G09F 9/00
(52) U.S. Cl. .......................... 455/566; 455/550; 349/67; 349/113
(58) Field of Search ............................... 455/569, 566, 455/90, 550, 575; 345/864; 349/113, 11, 17, 67, 69

(56) References Cited

U.S. PATENT DOCUMENTS

| | | | |
|---|---|---|---|
| 4,643,525 A | * | 2/1987 | Haim .......................... 349/161 |
| 5,663,816 A | | 9/1997 | Chen et al. .................... 359/15 |
| 5,896,575 A | | 4/1999 | Higginbotham et al. | |
| 5,926,293 A | * | 7/1999 | Ralli .......................... 359/15 |

FOREIGN PATENT DOCUMENTS

| EP | 0881617 A1 | * | 2/1998 | ............. G09F/9/35 |
|---|---|---|---|---|
| GB | 2 343 324 A | | 5/2000 | |
| JP | 10-198291 | | 7/1998 | ............. G09F/9/30 |
| JP | 2000 206523 A | | 11/1999 | |
| JP | 2001-051251 A | | 12/1999 | |
| JP | 2001 051251 A | | 12/1999 | |

* cited by examiner

*Primary Examiner*—Thanh Cong Le
*Assistant Examiner*—Nick Corsaro
(74) *Attorney, Agent, or Firm*—Brian M. Mancini

(57) ABSTRACT

A communication device (10) with a dual-sided liquid crystal display (12) located with a housing (14) having two viewports (18,22). The display (12) includes a liquid crystal panel (50) with an associated driver circuit (52). The panel (50) has a first side (60) for viewing a top portion (62) of the display (12) from the first viewport (18) and a second side (64) for viewing a bottom portion (66) of the display (12) from the second viewport (22). A top reflective layer (68) is disposed on the top portion (62) of the panel (50) on the second side (64) of the panel (50). A bottom reflective layer (70) is disposed on the bottom portion (66) of the panel (50) on the first side (60) of the panel (50). A processor (82) is coupled to the driver circuit (52), wherein the processor (82) directs the display (12) through the driver circuit (52) to provide user interface information for operating the communication device (10). The present invention provides a dual-sided display (12) on a single LCD panel (50) using one driving circuit (52).

15 Claims, 3 Drawing Sheets

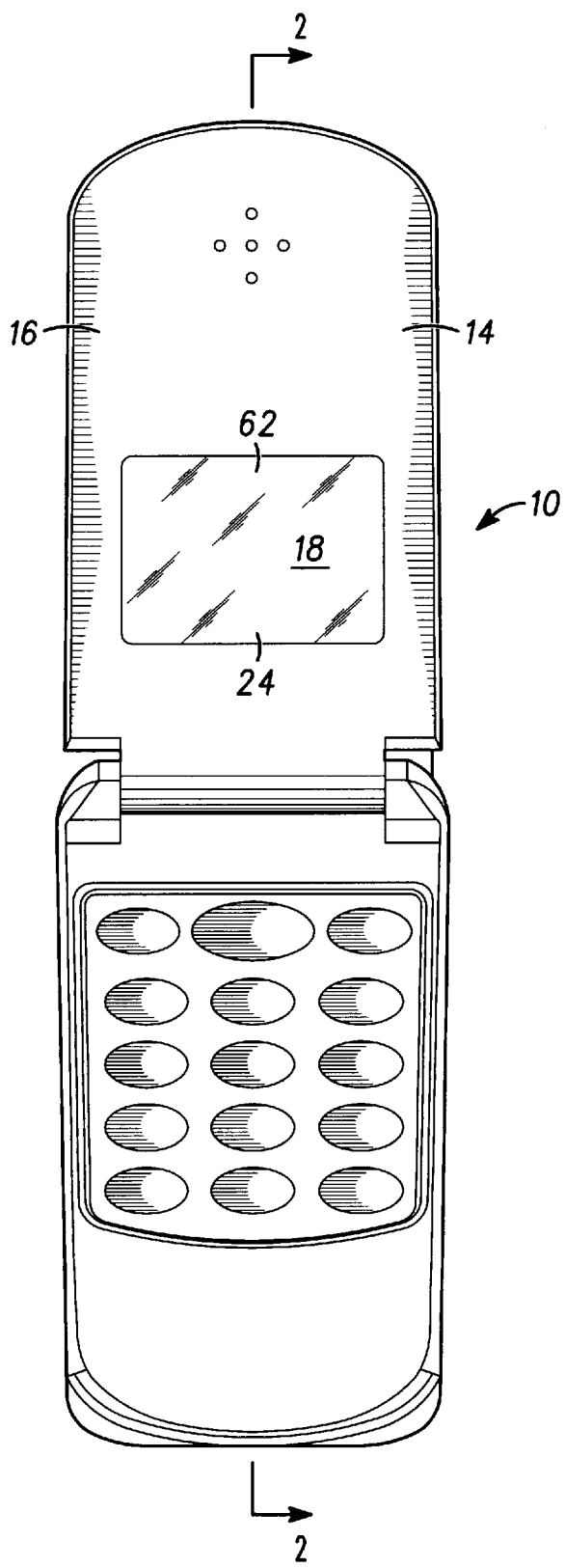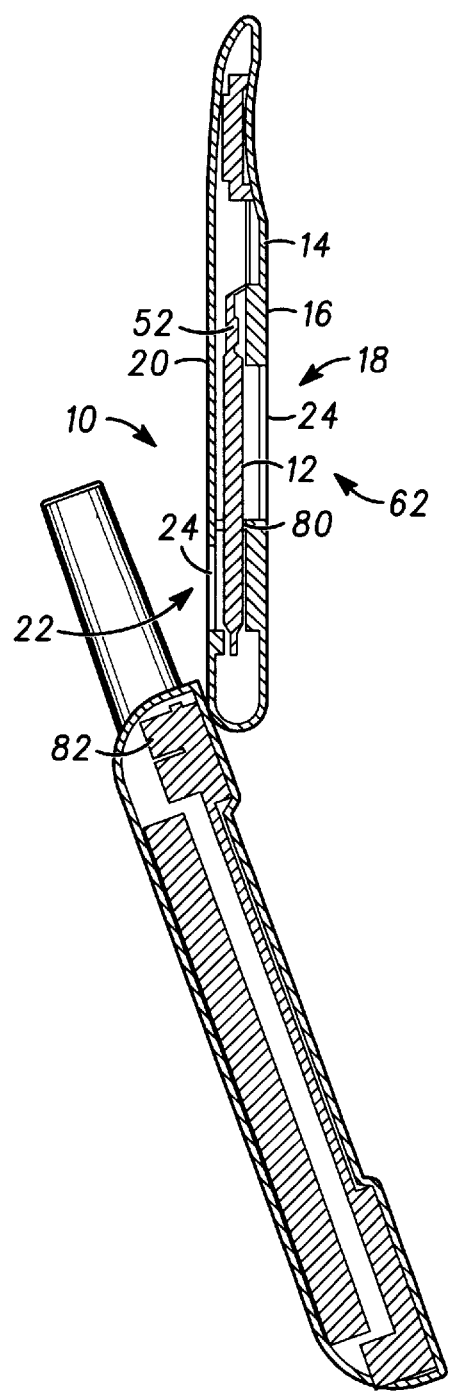
*FIG.1*  *FIG.2*

COMMUNICATION DEVICE WITH A DUAL-SIDED LIQUID CRYSTAL DISPLAY

FIELD OF THE INVENTION

The present invention relates generally to wireless communication systems. More particularly, the invention relates to a user interface display interface for a communication device.

BACKGROUND OF THE INVENTION

Many portable communication devices, such as cellular telephones, include a housing defining relatively large front and rear surfaces with thin sides. Such devices may be thin enough to fit within a pocket of clothing or to carry on a belt or a holster. Typically, the device has a user interface that includes one or more components such as a keypad or a display. When the device is carried as described above, the user interface may not be very accommodating to a user. For example, when such a device is carried on a belt of a user, the user interface can be completely or partially obstructed from the user's view.

In addition, some devices have flaps which cover the user interface for protection against various elements such as dirt or rain, or for other reasons such as for protection against inadvertent actuations at the keypad. Although highly beneficial, such flaps may similarly or further inhibit viewing of the user interface. For example, the display and keypad can be partially or completely covered preventing the user from discerning the status of the device unless it is removed from its holder and physically opened.

Accordingly, what is needed is a communication device having a user interface that is more accommodating to a user, and additionally one that does not substantially increase power consumption, driving circuitry, or cost of the communication device.

BRIEF DESCRIPTION OF THE DRAWINGS

FIG. 1 is a front view of a communication device in an open position and having a display, in accordance with the present invention;

FIG. 2 is a cross-sectional side view of the communication device of FIG. 1;

DETAILED DESCRIPTION OF THE PREFERRED EMBODIMENTS

Figure 3:
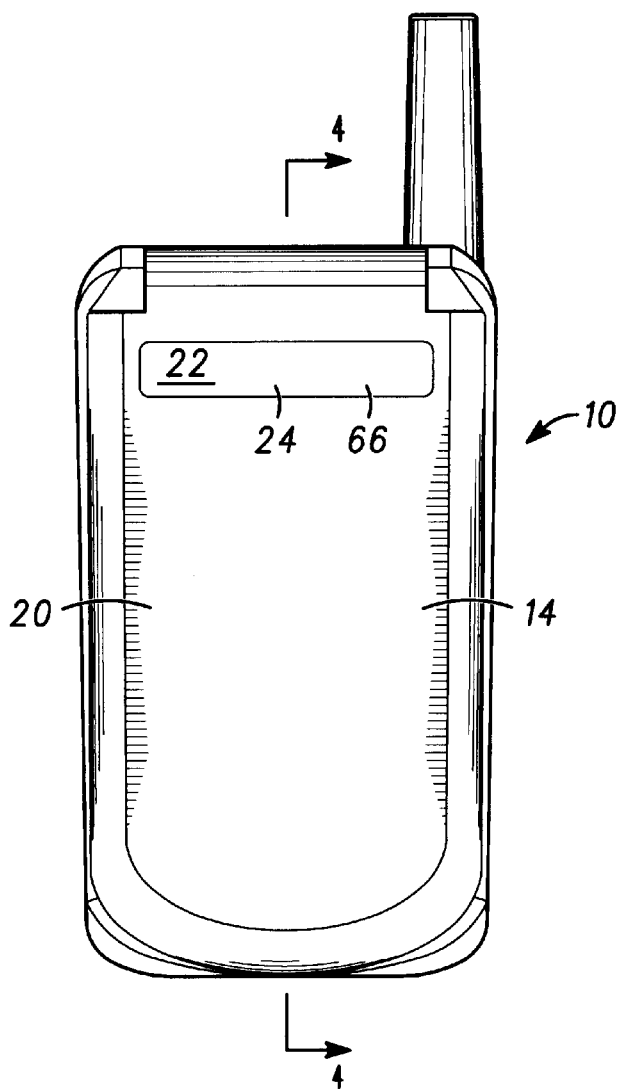
FIG. 3 is a front view of a communication device in a closed position and having a display, in accordance with the present invention.

The present invention provides a radio communication device that provides a dual sided display allowing a user the option of hands-free status of communication activities. The dual-sided display uses a single LCD panel and single driving circuit. This reduces size, weight, circuit complexity and cost.

The invention will have application apart from the preferred embodiments described herein, and the description is provided merely to illustrate and describe the invention and it should in no way be taken as limiting of the invention.

While the specification concludes with claims defining the features of the invention that are regarded as novel, it is believed that the invention will be better understood from a consideration of the following description in conjunction with the drawing figures, in which like reference numerals are carried forward. A radiotelephone is a communication device that communicates information to a base station using electromagnetic waves in the radio frequency range. The radiotelephone can be strapped to, or otherwise secured to, a person's belt or other holder.

The radiotelephone portion of the communication device is preferably a cellular radiotelephone adapted for personal communication, but may also be a pager, cordless radiotelephone, or a personal communication service (PCS) radiotelephone. The radiotelephone portion may be constructed in accordance with an analog communication standard or a digital communication standard. The radiotelephone portion generally includes a radio frequency (RF) transmitter, a RF receiver, a controller, an antenna, batteries, a duplex filter, a frequency synthesizer, a signal processor, and a user interface including at least one of a keypad, control switches, and a microphone. The radiotelephone portion can also include a paging receiver. The electronics incorporated into a cellular phone, two-way radio or selective radio receiver, such as a pager, are well known in the art, and can be incorporated into the communication device of the present invention.

FIGS. 1–5 illustrate a communication device according to the present invention. By way of example only, the communication device is embodied in a cellular phone having a conventional cellular radio transceiver as is known in the art and will not be presented here for simplicity). The cellular telephone, includes conventional cellular phone hardware (also not represented for simplicity) such as a battery, processor, and user interface that is integrated in a compact housing, and further includes an dual-sided display, in accordance with the present invention.

Figure 4:
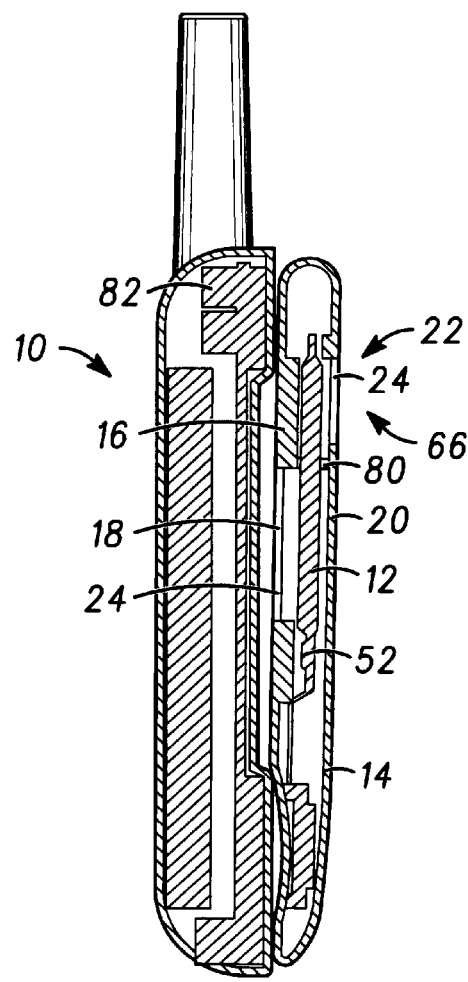
FIG. 4 is a cross-sectional side view of the communication device of FIG. 3.

The present invention includes a communication device 10 with a dual-sided liquid crystal display 12. The present invention includes a housing 14 for holding the display 12. The housing 14 has a first side 16 with a first viewport 18 and a second side 20 with a second viewport 22. Preferably, the viewports 18,22 of the housing 14 are covered with substantially transparent lenses 24 to keep out dust and dirt. Preferably, the housing 14 comprises a movable portion of the communication device 10 wherein the second viewport 22 is visible when the housing 14 is closed against the communication device 10 covering the first viewport 18, as represented in FIGS. 3 and 4. When the housing 14 is open both viewports 18,22 are visible with the first viewport 18 visible on the first side 16 of the housing 14 and the second viewport 22 visible on the second side 20 of the housing 14. Although the display is shown in a movable flip housing portion of the communication device, it should be recognized that the present invention could also be incorporated into a suitably thin communication device with a one-piece housing.

Figure 5:
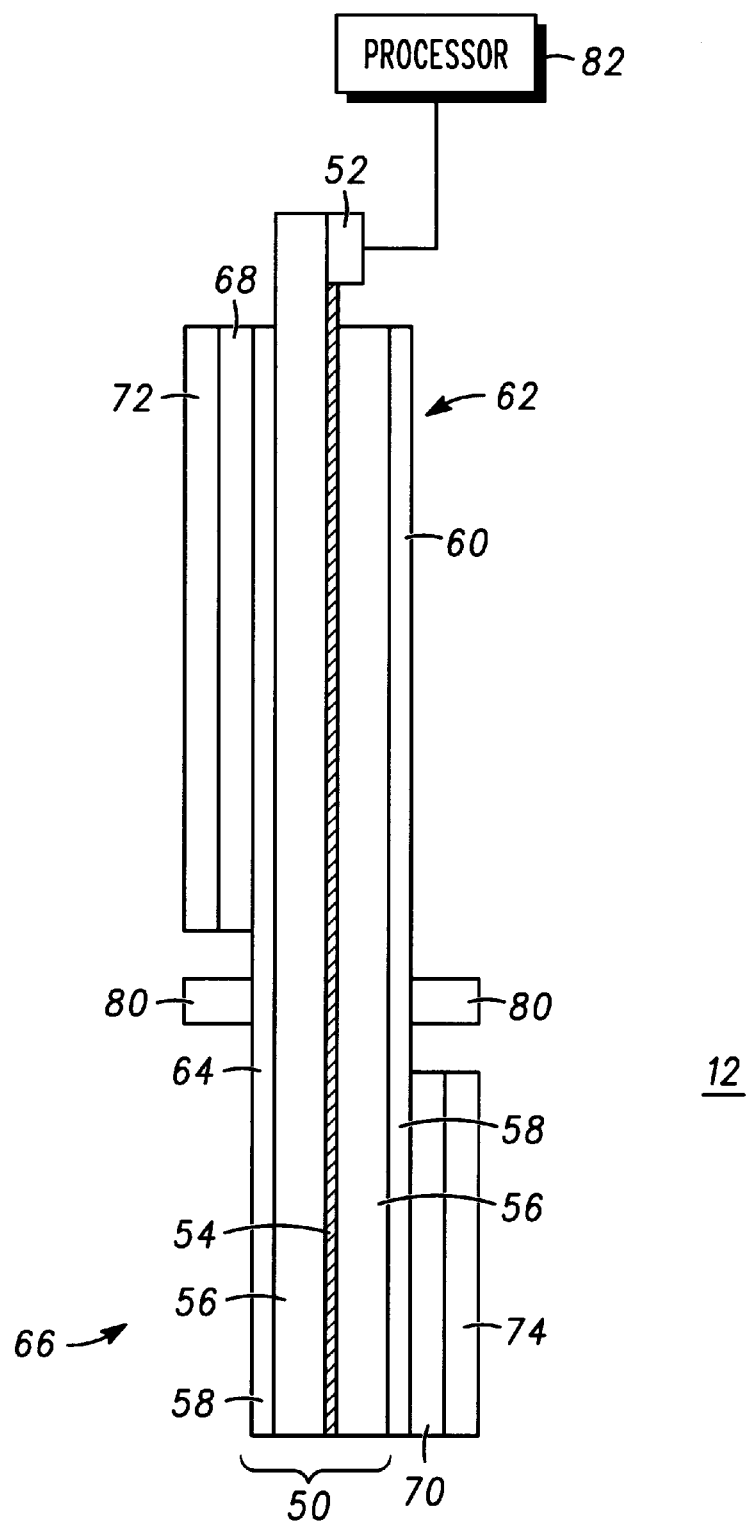
FIG. 5 is a simplified side view of a preferred embodiment of a display for a communication device, in accordance with the invention.

As represented in FIG. 5, the liquid crystal display of the present invention includes a liquid crystal panel 50 with an associated driver circuit 52, as is known in the art. The panel 50 includes a layer of liquid crystal material 54 sandwiched between two substantially transparent plates 56 and between polarizers 58. The polarizers 58 have perpendicular axes of polarization. Transparent electrodes (not shown) are affixed to the inner surfaces of the transparent plates 56 to alter the light transmission properties of the liquid crystal material 54 of the panel 50. In this manner, the electrodes define pixels that create the display. As used herein, pixels refer to a region of the liquid crystal panel that form light or dark areas in the panel when viewed from the side and when the associated electrodes in those areas are energized or de-energized. The pixels can be arranged in an array to form a graphical display or the commonly used figure-eight arrangement utilized for alphanumeric characters. In the present invention, the panel 50 has a first side 60 for viewing a top portion 62 of the display 12 from the first viewport 18 and a second side 64 for viewing a bottom portion 66 of the display 12 from the second viewport 22.

In the absence of an applied electric field, polarized light is admitted through one polarizer and reoriented by the liquid crystal layer 54 to pass through the opposite polarizer, thereby causing the panel to be transparent and creating a bright pixel for the display. However, where an electrical potential is applied between electrodes on either side of the pixel, this alters the liquid crystal layer 54 to prevent light from passing through the panel, thereby creating an opaque region in the panel that appears as a dark pixel. By selectively applying electrical current to the electrodes, pixels can be individually switched between a transparent or bright state and an opaque or dark state. While the liquid crystal panel 50 creates a display by locally altering light transmission in each pixel, the liquid crystal panel does not generate the light needed for viewing the display. There are two approaches for providing light for the display.

In a first embodiment of the present invention, ambient light is used to light the display. A top reflective layer 68 is disposed on the top portion 62 of the panel 50 on the second side 64 of the panel 50. A bottom reflective layer 70 is disposed on the bottom portion 66 of the panel on the first side 60 of the panel 50. The reflective layers 68,70 face the back side of the panel opposite their respective viewing portions 62,66. At a transparent area, ambient light is filtered through a first polarizer, traverses the panel 50, is reflected back by the associated reflective layer, and re-traverses the panel to create a bright pixel. Of course, at an opaque area light does not traverse the panel creating a dark pixel.

In a second embodiment of the present invention, light sources 72,74 illuminate the back of the viewing portions 62,66, whereupon the light from the light source 72,74 is screened by the back polarizer and traverses transparent regions of the panel to create bright pixels. Preferably, the light sources are electroluminescent panels, as is known in the art. The reflective layers and electroluminescent panels provide top and bottom display regions 62,64 sized to substantially fill their associated viewing ports 18,22. It is also preferred that the first embodiment be incorporated into the second embodiment. In this way alternative light resources can be used to the best advantage of each, i.e. the reflective properties of the first embodiment are best used in high ambient light and the transmissive properties of the above embodiment for darkly lighted environments. To accomplish this result it is necessary that the reflective layers 68,70 be transflective in order to pass the light from the light sources 72,74. In particular, a top light source 72 is coupled to the top reflective layer 68 and a bottom light source 74 is coupled to the bottom reflective layer 70, wherein the reflective layers 68,70 are sandwiched between the panel and their associated light sources 72,74. As the reflective layers are actually transflective, the light sources provide backlighting through their associated reflective layer and into the panel.

A transflector reflects ambient light and transmits light from the light source. However, the reflection efficiency is necessarily reduced by adding transmissive properties. Similarly, transmission properties are reduced by increased reflection properties. For example, a transflector can transmit fifty percent of the light from the light source and reflect fifty percent of ambient light such that the proportion of viewable light in either mode is reduced. Therefore, it is preferred that the reflective layers 68,70 are holographic elements optically coupled to the panel 50 such light traversing the top portion 62 of the panel 50 from the first side 60 to the reflective layer 68 on the second side 64 is reflected back towards the first side 60 and light traversing the bottom portion 66 of the panel 50 from the second side 64 to the reflective layer 70 on the first side 60 is reflected back towards the second side 64.

In particular, the reflective holographic element redirects the light in constricted reflection patterns about a preferential axis that constitutes a preferred viewing angle, thereby increasing the amount of reflected light, as is known in the art. In addition, the holographic element can be electrically switched by the driving circuit to further enhance either a reflective or transmissive mode of operation. Moreover, an additional material layer can be interposed between the light sources and their associated reflectors such that the material layer is chosen to pass only that spectrum of frequencies generated by the light source, thereby providing color optimization for the display. Suitable holographic materials and applications thereof are described in U.S. Pat. No. 5,663,816 to Chen et al. which is hereby incorporated by reference.

In a preferred embodiment, a light barrier 80 is disposed around the panel 50 and between the panel 50 and the housing 14 to optically separate the top and bottom portions 62,66 of the display 12. Although this is not a requirement, the light barrier serves to absorb stray light within the LCD panel and between the top and bottom portions of the panel. Also, it is preferred to have the light barrier installed between the display and the housing to further isolate from reflected light and to provide additional mechanical strength in the mounting of the display in the housing.

In operation, a processor 82 is coupled to the driver circuit 52, wherein the processor 82 directs the display 12 through the driver circuit 52 to provide user interface information for operating the communication device 10. Preferably, the processor is shared with, and provides radio telephones operation for, the communication device 10. The processor 82 drives the bottom portion 66 of the display 12 to provide alphanumeric information including at least one of the group comprising a date, a time, and a caller ID telephone number through the second viewport 18 of the housing 14. Preferably, the processor 82 drives the bottom portion 66 of the display to display the alphanumeric information in one of two orientations according to user preference. For example, as represented in FIG. 3, a caller ID number can be displayed with the number read right-side-up in the display (i.e., the top of the digits of the number are closest to a hinge of the communication device) or the caller ID number can be displayed with the bottom of the digits of the number closest to a hinge of the communication device. With the former, the caller ID number is most easily read when the communication device is hand-held. With the latter, the caller ID number can be quickly viewed upside-down when the communication device is located in a belt or holster on the user. The processor 82 drives the top portion 62 of the display 12 to provide graphical or alphanumeric information representing operating conditions of the communication device 10.

In all of the aforementioned embodiments it is preferred that the structures as shown in FIG. 5, with the exception of the driving circuit 52 and processor 82, are laminated onto the panel 50 to form an integrated structure.

The present invention provides numerous advantages. Firstly, the dual-sided display is thinner than using two back-to-back displays since only one LCD panel is needed which saves size, weight and cost. Secondly, only a single driving circuit is needed which saves power, size, weight and cost. Thirdly, differently sized displays can be utilized, whereas with back-to-back displays some type of light barrier must be interposed to prevent light from the light sources from bleeding into either display.

It is to be understood that the phraseology or terminology employed herein is for the purpose of description and not of limitation. Accordingly, the invention is intended to embrace all such alternatives, modifications, equivalents and variations as fall within the broad scope of the appended claims.

What is claimed is:

1. A communication device with a dual-sided liquid crystal display, comprising:
    a housing for holding the display, the housing having a first side with a first viewport and a second side with a second viewport;
    a liquid crystal panel with an associated driver circuit, the panel having a first side for viewing a top portion of the display from the first viewport and a second side for viewing a bottom portion of the display from the second viewport;
    a top reflective layer disposed on the top portion of the panel on the second side of the panel;
    a bottom reflective layer disposed on the bottom portion of the panel on the first side of the panel; and
    a processor coupled to the driver circuit, wherein the processor directs the display through the driver circuit to provide user interface information for operating the communication device, and wherein
    the reflective layers are holographic elements optically coupled to the panel such that light traversing the top portion of the panel from the first side to the reflective layer on the second side is reflected back towards the first side and light traversing the bottom portion of the panel from the second side to the reflective layer on the first side is reflected back towards the second side.

2. The communication device of claim 1, wherein the reflective layers are transflective, and further comprising a top light source coupled to the top reflective layer and a bottom light source coupled to the bottom reflective layer, wherein the reflective layers are sandwiched between the panel and their associated light sources, the light sources provide backlighting through their associated reflective layer and into the panel.

3. The communication device of claim 2, wherein light sources are electroluminescent panels, and wherein the reflective layers and electroluminescent panels provide top and bottom display regions sized to substantially fill their associated viewing ports.

4. The communication device of claim 1, further comprising a light barrier disposed around the panel and between the panel and the housing to optically separate the top and bottom portions of the display.

5. The communication device of claim 4, wherein the light barrier serves to absorb stray light within the panel and between the top and bottom portions of the panel.

6. The communication device of claim 1, wherein the viewports of the housing are covered with substantially transparent lenses.

7. The communication device of claim 1, wherein the housing comprises a movable portion of the communication device wherein the second viewport is visible when the housing is closed against the communication device covering the first viewport.

8. The communication device of claim 1, wherein the processor drives the bottom portion of the display to provide alphanumeric information including at least one of the group comprising a date, a time, and a caller ID telephone number through the second viewport of the housing.

9. The communication device of claim 8, wherein the processor drives the bottom portion of the display to display the alphanumeric information in one of two orientations according to user preference.

10. A communication device with a dual-sided liquid crystal display, comprising:
    a housing for holding the display, the housing having a first side with a first viewport and a second side with a second viewport;
    a liquid crystal panel with an associated driver circuit, the panel having a first side for viewing a top portion of the display from the first viewport and a second side for viewing a bottom portion of the display from the second viewport;
    a top transflective layer disposed on the top portion of the panel on the to second side of the panel;
    a top electroluminescent panel coupled to the top transflective layer such that the top transflective layer is sandwiched between the panel and the top electroluminescent panel;
    a bottom transflective layer disposed on the bottom portion of the panel on the first side of the panel;
    a bottom electroluminescent panel coupled to the bottom transflective layer such that the bottom transflective layer is sandwiched between the panel and the bottom electroluminescent panel; and
    a processor coupled to the driver circuit, wherein the processor directs the display through the driver circuit to provide user interface information for operating the communication device, and wherein
    the top and bottom transflective layers are holographic elements optically coupled to the panel such that light traversing the top portion of the panel from the first side to the transflective layer on the second side is reflected back towards the first side and light traversing the bottom portion of the panel from the second side to the transflective layer on the first side is reflected back towards the second side.

11. The communication device of claim 10, wherein the top and bottom transflective layers and the top and bottom electroluminescent panels provide top and bottom display regions sized to substantially fill their associated viewing ports, in their respective display regions the electroluminescent panels provide backlighting through the associated transflective layer and into the panel.

12. The communication device of claim 10, further comprising a light barrier disposed around the panel and between the panel and the housing to optically separate the top and bottom portions of the display, the light barrier serves to absorb stray light within the panel and between the top and bottom portions of the panel.

13. The communication device of claim 10, wherein the viewports of the housing are covered with substantially transparent lenses.

14. The communication device of claim 10, wherein the processor drives the bottom portion of the display to provide at least one of the group comprising a date, a time, and a caller ID telephone number through the second viewport of the housing.

15. The communication device of claim 10, wherein the housing comprises a movable portion of the communication device wherein the second viewport is visible when the housing is closed against the communication device covering the first viewport.

* * * * *